(12) United States Patent
Laskaris et al.

(10) Patent No.: US 10,938,280 B2
(45) Date of Patent: Mar. 2, 2021

(54) FLUX SHIELD FOR ELECTRIC MOTOR

(71) Applicant: Tesla Motors, Inc., Palo Alto, CA (US)

(72) Inventors: Konstantinos Laskaris, San Mateo, CA (US); Andrew D. Baglino, San Francisco, CA (US); Chad Furey, Hopkins, MN (US); David F. Nelson, Menlo Park, CA (US)

(73) Assignee: Tesla, Inc., Palo Alto, CA (US)

( * ) Notice: Subject to any disclaimer, the term of this patent is extended or adjusted under 35 U.S.C. 154(b) by 895 days.

(21) Appl. No.: 14/070,214

(22) Filed: Nov. 1, 2013

(65) Prior Publication Data
US 2015/0123511 A1    May 7, 2015

(51) Int. Cl.
| | | |
|---|---|---|
| *H02K 11/01* | (2016.01) | |
| *H02K 19/10* | (2006.01) | |
| *H02K 17/12* | (2006.01) | |
| *H02K 11/00* | (2016.01) | |

(52) U.S. Cl.
CPC ....... *H02K 11/012* (2020.08); *H02K 11/0141* (2020.08); *H02K 17/12* (2013.01); *H02K 19/10* (2013.01); *H02K 11/00* (2013.01); *H02K 2205/12* (2013.01)

(58) Field of Classification Search
CPC ........ H02K 3/42; H02K 5/128; H02K 17/165; H02K 11/00; H02K 11/01; H02K 11/05; H02K 11/0005; H02K 17/12; H02K 19/10; H02K 2205/12; H02K 11/012; H02K 11/0141
USPC ............ 310/89, 84, 85, 86, 51, 156.78, 256, 310/216.108, 211, 212, 210, 156.79, 310/156.83, 216.114–216.123, 400, 310/406–411
See application file for complete search history.

(56) References Cited

U.S. PATENT DOCUMENTS

| | | | |
|---|---|---|---|
| 3,235,756 A | 2/1966 | Anderson | |
| 3,436,580 A | 4/1969 | Brennan et al. | |
| 3,502,916 A * | 3/1970 | Stavrache | H02K 9/06 310/59 |
| 4,054,809 A * | 10/1977 | Jefferies | H02K 3/42 310/256 |
| 4,197,975 A | 4/1980 | Williamson | |
| 4,233,535 A | 11/1980 | Barone | |
| 4,644,210 A | 2/1987 | Meisner et al. | |
| 4,733,118 A * | 3/1988 | Mihalko | H02K 3/47 310/156.08 |

(Continued)

FOREIGN PATENT DOCUMENTS

| | | |
|---|---|---|
| CA | 2485937 A1 | 4/1995 |
| CN | 1204882 A | 1/1999 |

(Continued)

OTHER PUBLICATIONS

International Search Report in application PCT/US2014/062869, dated Mar. 4, 2015, 7 pages.

(Continued)

*Primary Examiner* — Tulsidas C Patel
*Assistant Examiner* — Robert E Mates
(74) *Attorney, Agent, or Firm* — Knobbe Martens Olson & Bear LLP

(57) ABSTRACT

An electric motor includes: a stator; a shaft; a rotor mounted on the shaft, the rotor having an end ring that is concentric with the shaft; and a flux shield around the shaft inside the end ring.

7 Claims, 7 Drawing Sheets

(56) References Cited

U.S. PATENT DOCUMENTS

| | | | |
|---|---|---|---|
| 5,185,918 A | 2/1993 | Shafer, Jr. | |
| 5,203,070 A * | 4/1993 | Montgomery | H02K 15/00 29/596 |
| 5,230,616 A | 7/1993 | Serizawa et al. | |
| 5,398,404 A | 3/1995 | Meyer et al. | |
| 5,444,319 A | 8/1995 | Nakamura et al. | |
| 5,642,010 A * | 6/1997 | Carosa | H02K 17/185 29/598 |
| 5,729,885 A | 3/1998 | Carosa et al. | |
| 5,838,085 A | 11/1998 | Roesel, Jr. et al. | |
| 5,912,516 A | 6/1999 | Atkinson et al. | |
| 5,952,764 A * | 9/1999 | Nakamura | B22D 19/0054 310/211 |
| 6,091,173 A * | 7/2000 | Byrd | H02K 11/01 310/211 |
| 6,229,243 B1 | 5/2001 | Roesel, Jr. et al. | |
| 6,624,543 B1 | 9/2003 | Bankstahl | |
| 6,682,323 B2 | 1/2004 | Milliff | |
| 6,751,842 B2 | 6/2004 | Roesel et al. | |
| 6,844,637 B1 | 1/2005 | Smith et al. | |
| 7,102,259 B2 | 9/2006 | Kawaguchi et al. | |
| 7,318,403 B1 | 1/2008 | Huart et al. | |
| 7,504,756 B2 | 3/2009 | Caprio et al. | |
| 7,834,492 B2 | 11/2010 | Iund et al. | |
| 8,203,249 B1 | 6/2012 | Rao | |
| 2001/0022482 A1 * | 9/2001 | Leyvraz | H02K 1/16 310/429 |
| 2007/0262658 A1 * | 11/2007 | Drubel | H02K 3/42 310/44 |
| 2007/0290566 A1 * | 12/2007 | Mizutani | H02K 1/276 310/156.56 |
| 2009/0295249 A1 | 12/2009 | Kinjou et al. | |
| 2010/0019606 A1 | 1/2010 | Mizutani et al. | |
| 2010/0231067 A1 | 9/2010 | Ruffing et al. | |
| 2011/0241473 A1 * | 10/2011 | Hippen | H02K 17/165 310/211 |
| 2011/0254400 A1 | 10/2011 | Vallejo | |
| 2011/0298315 A1 | 12/2011 | Fulton | |
| 2013/0069476 A1 | 3/2013 | Lyons et al. | |

FOREIGN PATENT DOCUMENTS

| | | |
|---|---|---|
| CN | 102208837 A | 10/2011 |
| JP | 09215286 A | 8/1997 |
| JP | 2008160909 | 7/2008 |
| KR | 20080094124 A | 10/2008 |
| WO | 2011129853 A1 | 10/2011 |

OTHER PUBLICATIONS

Aldo Canove, et al., 3D eddy current FE analysis of electromechanical devices, Compel: The International Journal for Computation and Mathematics in Electrical and Electronic Engineering (abstract) 2001.

Copper Development Association Inc., Copper improves the performance of induction motors, 2013.

GE Industrial Control Systems, Aluminum Rotor Construction, 1999.

Natural Resources Canada, Principles of operation—AC VFD drives, 2009.

State Intellectual Property Office; Search Report; CN App No. 201480053345.1; dated Feb. 24, 2018; 2 pgs.

* cited by examiner

FLUX SHIELD FOR ELECTRIC MOTOR

BACKGROUND

Electric motors are used in a number of different contexts. Generally, an electric motor consists of a rotor and a stator inside a housing. Both the rotor and stator can include copper or another conductive material. For example, the stator can have copper end turns and the rotor can have a copper end ring. Both of these copper components generate excitation when the motor is operating. Some amount of magnetic flux from the copper parts is subject to leaking, meaning that the magnetic flux lines do not close inside the active part of the motor. Flux lines that close in non-active parts of the motor do not contribute to the torque of the motor. Particularly, when the motor is operating at high speed (i.e., a high frequency) the leakage can reduce the motor's power. From an electromagnetic perspective, the flux leakage is not necessarily considered a loss, but it makes the motor effectively smaller, which is undesirable.

SUMMARY

In a first aspect, an electric motor includes: a stator; a shaft; a rotor mounted on the shaft, the rotor having an end ring that is concentric with the shaft; and a flux shield around the shaft inside the end ring.

Implementations can include any or all of the following features. The flux shield comprises a cylinder surrounding the shaft inside the end ring. The flux shield is integral with a housing for the electric motor. The housing includes an end member holding a bearing insert for the shaft, and wherein the flux shield extends from the end member. The flux shield and at least part of the housing form a square toroid enclosure, and wherein the end ring and end turns of the stator are contained in the square toroid enclosure. The flux shield comprises at least one material selected from the group consisting of aluminum, magnesium and passive copper. The rotor comprises a stack of laminates and wherein the end ring is spaced from the stack in an axial direction of the shaft, and wherein the flux shield extends past the end ring toward the stack. The electric motor further comprises a housing for the electric motor, and a stator stationary flux shield between a core of the stator and end turns of the stator. The stator stationary flux shield is ring shaped. The flux shield comprises a rotor flux shield, and wherein the rotor flux shield is made from the same material as the stator stationary flux shield. The electric motor further includes another end ring on an opposite end of the rotor, and another flux shield around the shaft inside the other end ring. The flux shield comprises a stationary flux shield. The stationary flux shield comprises a cylinder-shaped portion. The stationary flux shield comprises a disc-shaped portion extending from the cylinder-shaped portion. The flux shield comprises a rotating flux shield. The rotating flux shield extends from a spacer on a core of the rotor, the spacer serving to space the end ring from the rotor core. The rotating flux shield and the spacer form an L-profile in cross section.

DETAILED DESCRIPTION

This document describes examples of stationary flux shields for electric motors. In some implementations, the flux shield is placed between a rotor end ring and the shaft of the motor. Alternatively, or in addition, a flux shield can be located between the stator core and its end turns. The flux shield reduces leakage of magnetic flux from the motor so that more of the magnetic flux lines close inside, not outside, the motor's active parts. Generally, the motor's magnetic field induces eddy currents in the flux shield material which helps reduce the amount of magnetic flux lines inside the flux shield. The reduction in leakage of the magnetic flux can allow more useful flux in the motor's active parts. This in turn, helps the motor generate more torque, particularly when operating in the field weakening region (at high speed/constant voltage).

Figure 1:
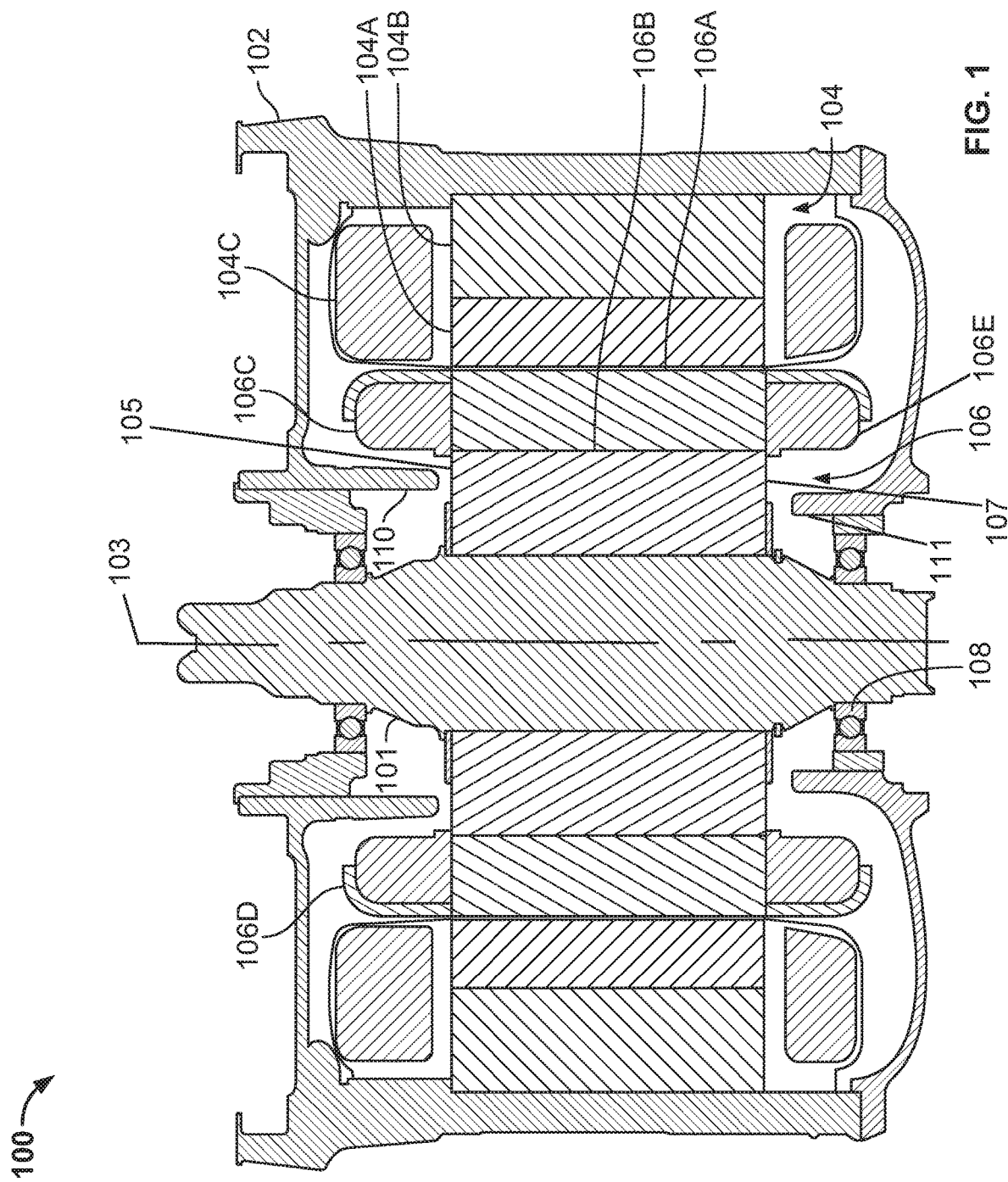
FIG. 1 shows an example cross section of an electric motor.

FIG. 1 shows an example cross section of an electric motor 100. Here, the cross section is taken along the axis 103 of the motor's shaft 101, which can be connected to a gearbox or to another driving component which are not shown for clarity. The motor is contained within a housing 102, which can be made from aluminum or another magnetically permeable/magnetically permissive material that is non-conductive. Held inside the housing are a stator 104 and a rotor 106. Here, the stator includes a portion 104A, a core portion 104B and end turns 104C. The rotor here includes a portion 106A, a core portion 106B, end rings 106C and containment ring 106D. The core portions 104B and 106B are made from a highly magnetically permissive material, such as steel. The portions 104A and 106A can be made from sparse iron, such as by placing copper bars in slots formed between teeth of iron. For example, the rotor 106 can be made by forming a stack of steel laminates.

The stator end turns 104C and the rotor end rings 106C can be made from copper, for example, or another conductive material. In some implementations, the containment ring 106D is made of a hardened material can serve to prevent or reduce the deformation of the rotor end ring 106C that may occur due to centrifugal force during rotation.

The rotor 104 is mounted on the shaft, which is suspended by bearing inserts 108 that in this example are held by a part of the housing 102.

In this example, the parts of the housing 102 that hold the bearing inserts 108 also provide shields 110 that are positioned between the rotor end ring 106C and the corresponding section of the shaft 101. In this axisymmetric representation, the flux shield 110 can be considered a cup or a cylinder, in that it extends rotationally around the shaft. In some implementations, the flux shield can extend from the bearing insert essentially up to the outer surface of the rotor. In implementations that have rotor end rings on both ends of the rotor, each of the end rings can have a flux shield. For example, as shown in FIG. 1, end rings 106C and 106E are shown attached to outer surfaces 105 and 107 of rotor 106 respectively, and flux shields 110 and 111 are shown extending from housing 102 towards outer surfaces 105 and 107 respectively.

The flux shield can be manufactured from a material that is magnetically permissive but not conductive. For example, one or more flux shields can be made from aluminum, magnesium and/or passive copper.

Figure 2:
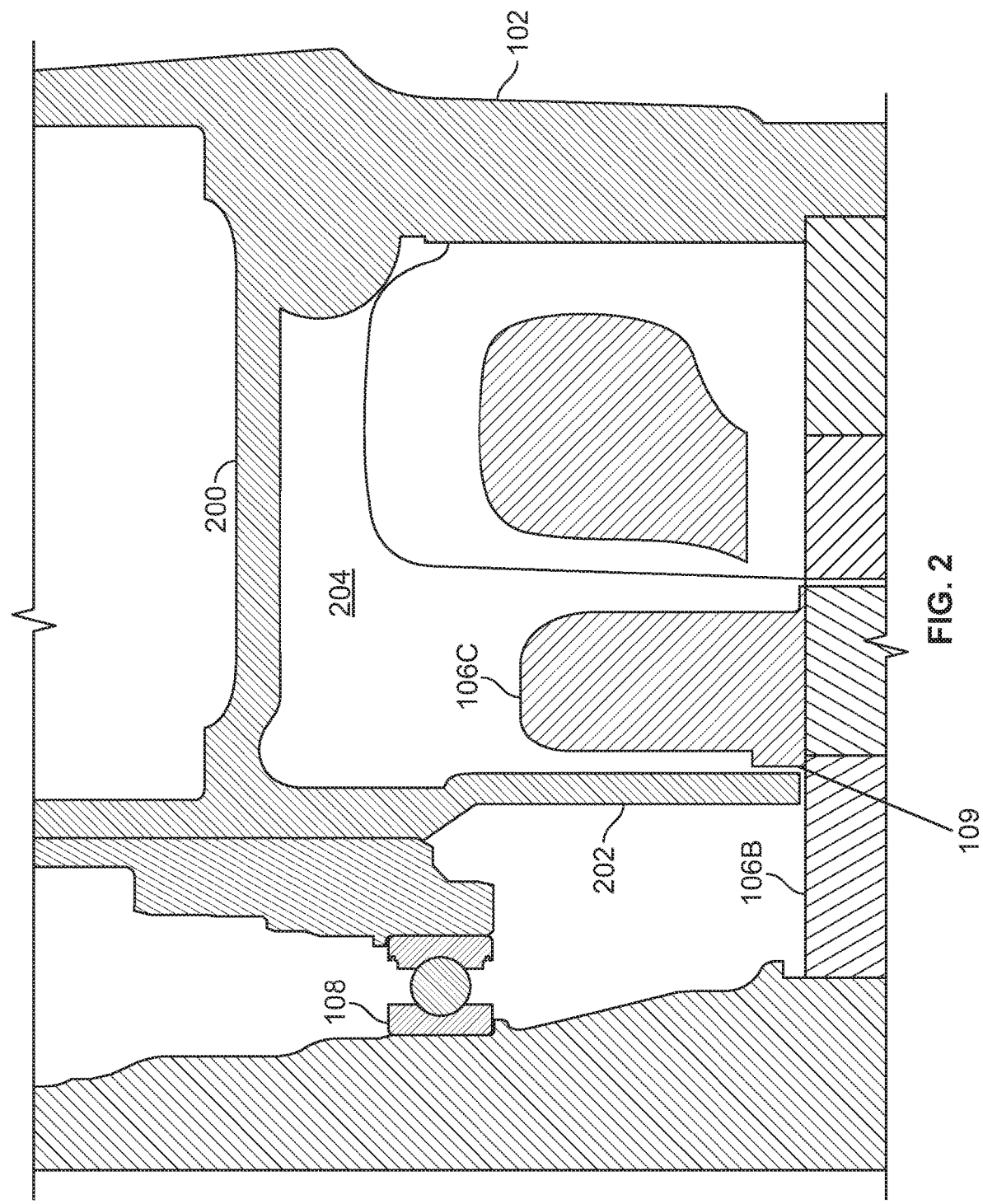
FIGS. 2-6 show examples of flux shields.

FIGS. 2-6 show examples of conductive flux shields. Each example shows a portion of the housing 102 and of the bearing insert 108, which is held by a housing member 200, as well as parts of the rotor and stator, respectively. In FIG. 2, a flux shield 202 extends from the member 200 axially toward the rotor core portion 106B. In doing so, the flux shield passes closely by the rotor end ring 106C. In this example, the flux shield ends near the rotor core; that is, near the outermost one of the laminates that make up the rotor. Here the flux shield 202 is somewhat thinner where it faces the end ring than where the bearing insert is attached. In other implementations, the flux shield can be of a substantially constant thickness, or can be thicker where it is near the end ring than in other areas.

Here, in a region where the flux shield 202 is closer to the rotor end ring 106C, the flux shield is radially offset relative to other areas. In other words, the part of the flux shield that is near the end ring is a larger-diameter cylinder than the part of the flux shield that is axially further away from the end ring and closer to the bearing insert. In other implementations, no offset, or an offset in the opposite direction can be used; that for example, the flux shield can be a narrower cylinder close to the rotor end ring, and have a larger diameter otherwise.

In operation, the current densities that are generated in the rotor end ring and in the stator end turns will induce eddy currents in the surface of the flux shield 202. As a result, the magnetic flux lines are instead directed more into the active parts of the motor than would otherwise be the case. For example, the housing 102, the member 200 and the flux shield 202 can be said to form an enclosure 204 that contains the rotor end ring and the stator end turns. This enclosure increases the tendency of the magnetic flux lines to close inside the active parts of the motor, and thereby helps increase the torque available from the motor, particularly at high rotation speeds.

In some implementations, the flux shield 202 and/or the member 200 can be closely fitted to the stator end turns, or to the rotor end ring, or both. For example, the enclosure 204 can be designed so that the flux shield 202 begins near the base 109 of the end ring (i.e., as illustrated) and then closely traces the outer surface of the end ring without contact until it meets the end turns. From that point, the flux shield can closely trace the outer surface of the stator end turns until it meets the motor housing. Because the end turns and the flux shield are stationary, the flux shield can be positioned closer relative to the end turns (e.g., in direct contact than it is relative to the rotor end ring, because of the relative motion between them.

Figure 3:
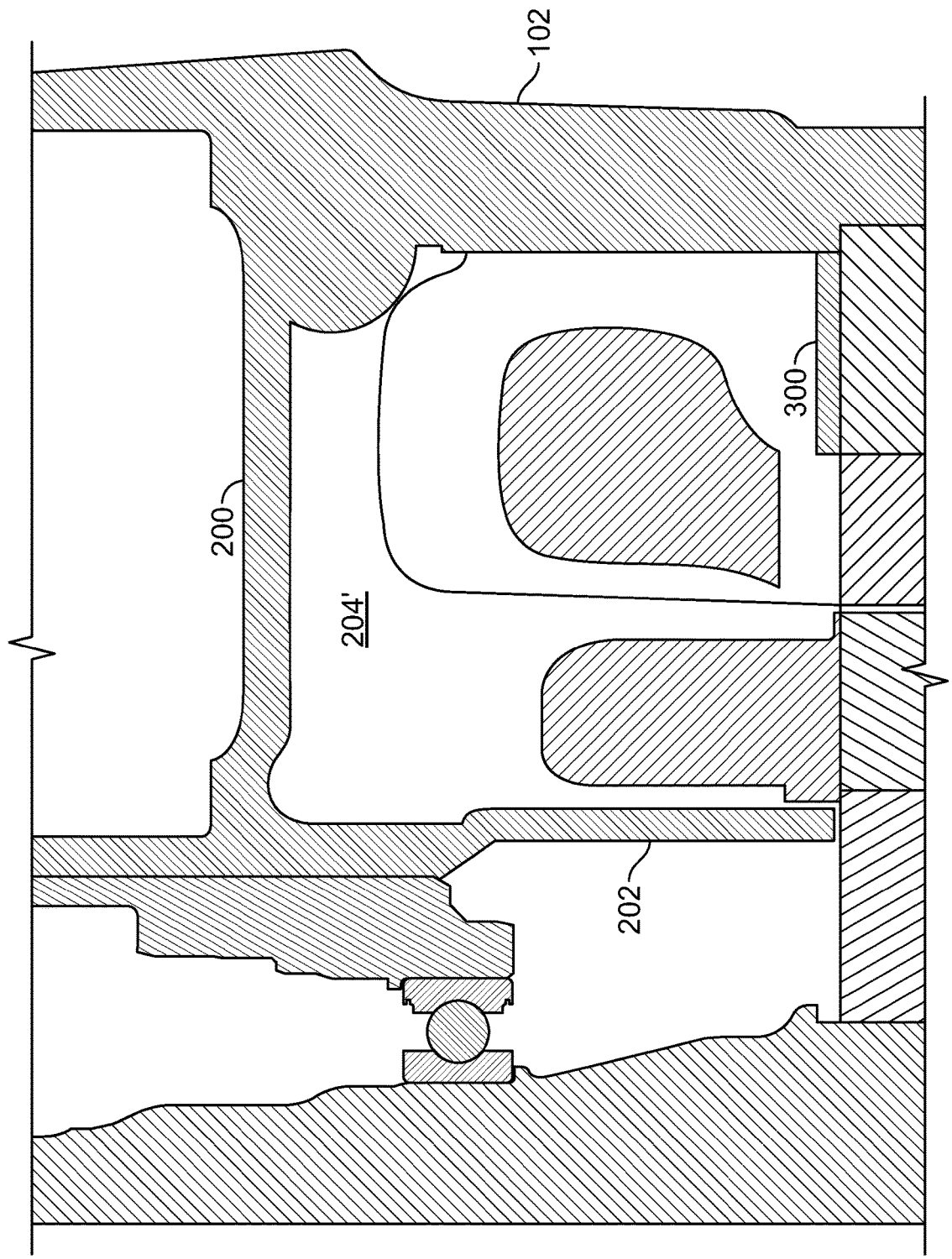

In FIG. 3, a stator flux shield 300 is provided. Other than the addition of the stator flux shield, the current example is equivalent to the one in FIG. 2. The stator flux shield is located between the core of the stator and the stator end turns, and can have essentially a disc or ring shape, for example. In some implementations, the stator flux shield consists of two (or more) pieces that are assembled in place before the stator is inserted into the motor housing. The stator flux shield can be placed on the stator before or after the stator end turns are covered, such as by resin.

In some implementations, the stator flux shield 300 can be made from the same material as the housing. For example, the stator flux shield and the flux shield 202 can be made from the same material.

An enclosure 204' is formed by the housing 102, the member 200, the flux shield 202 and the stator flux shield 300. For example, the enclosure can help contain the magnetic flux lines so that more of them close inside the active part.

In the above examples, the rotor flux shield is stationary and does not rotate with the rotor. This means that the shield is subjected to the absolute frequency of the stator and rotor fields (and not to the slip frequency, for example). The amount of eddy currents induced in the shield may depend on the frequency to which the material is exposed.

Figure 4:
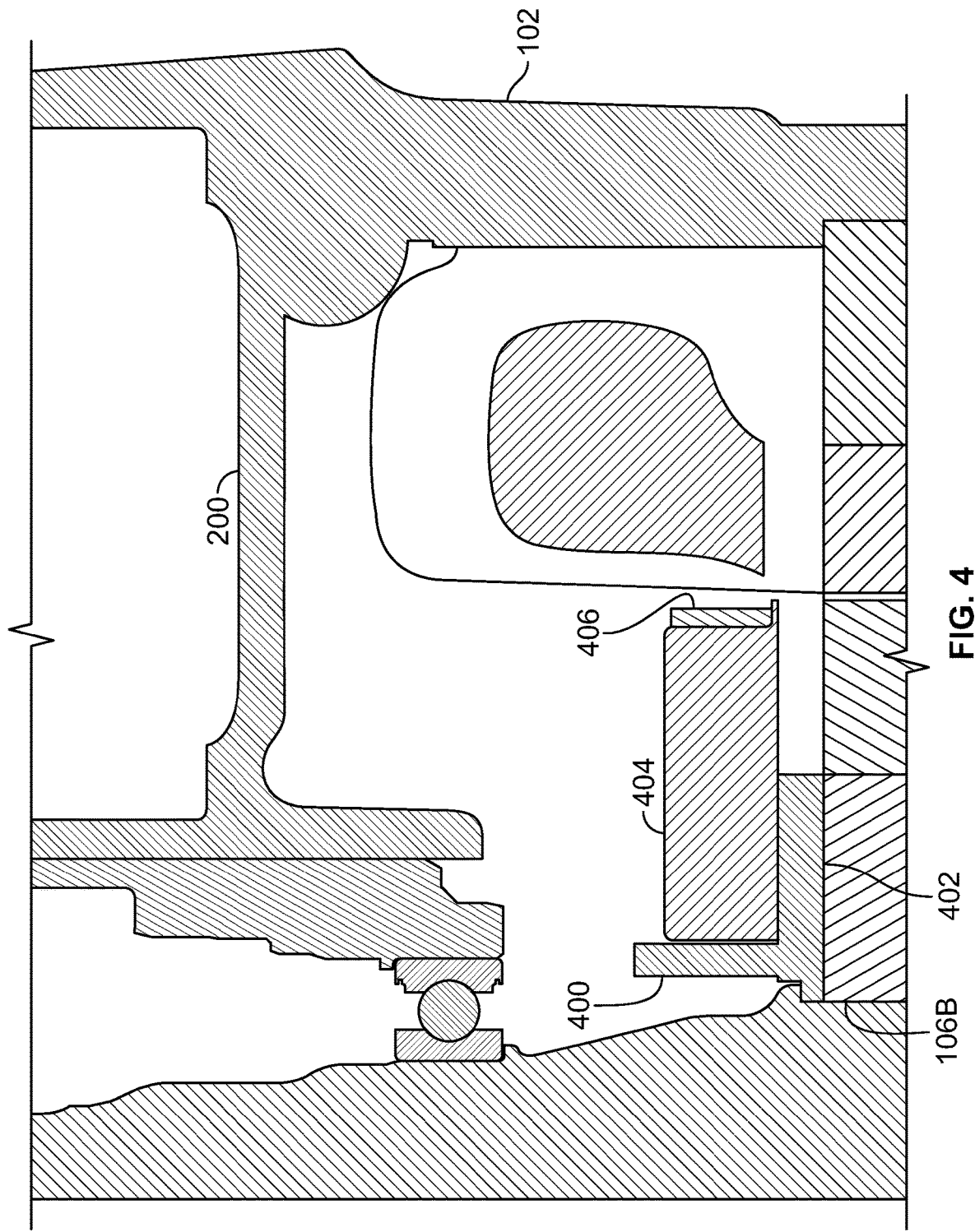
Figure 5:
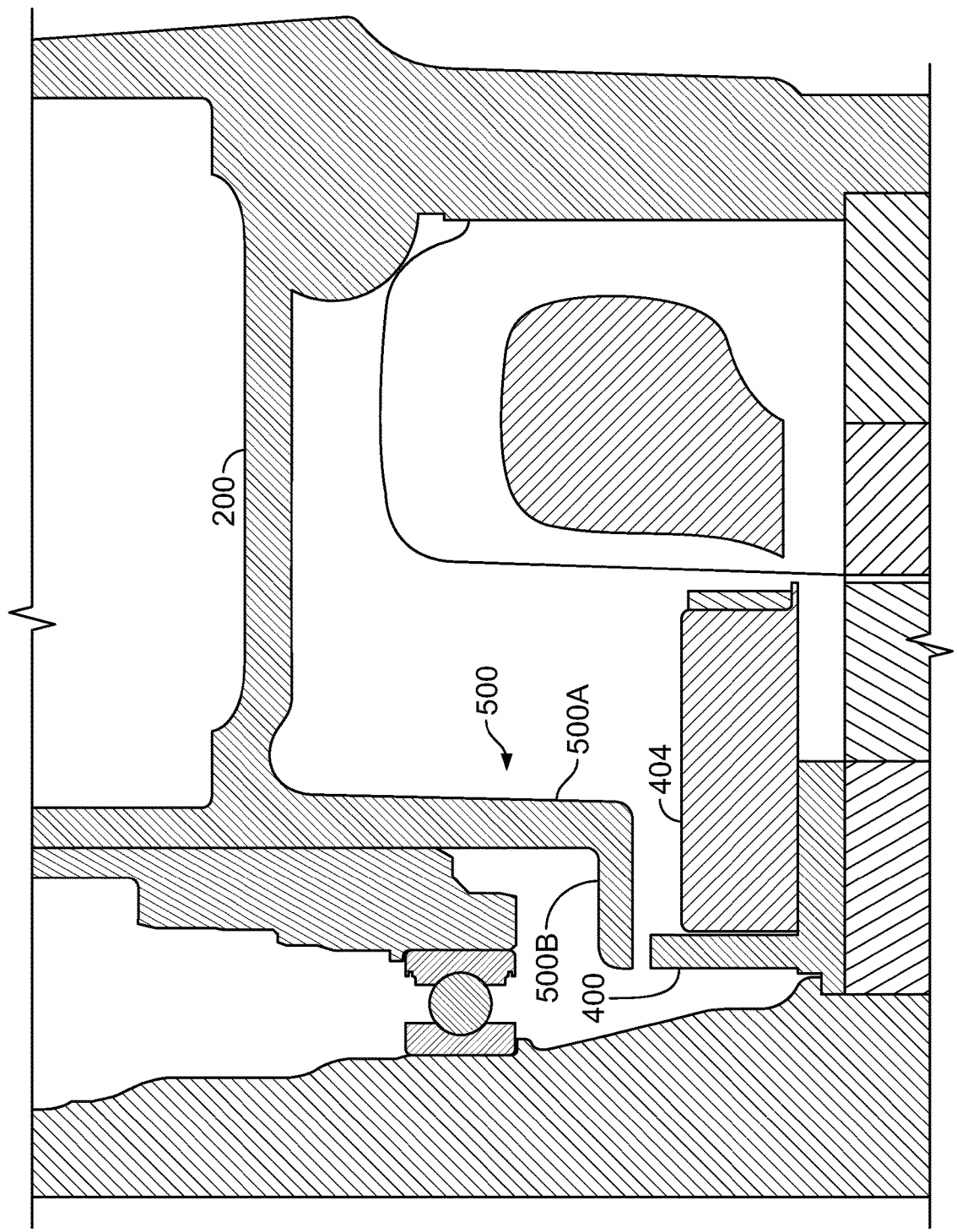
Figure 6:
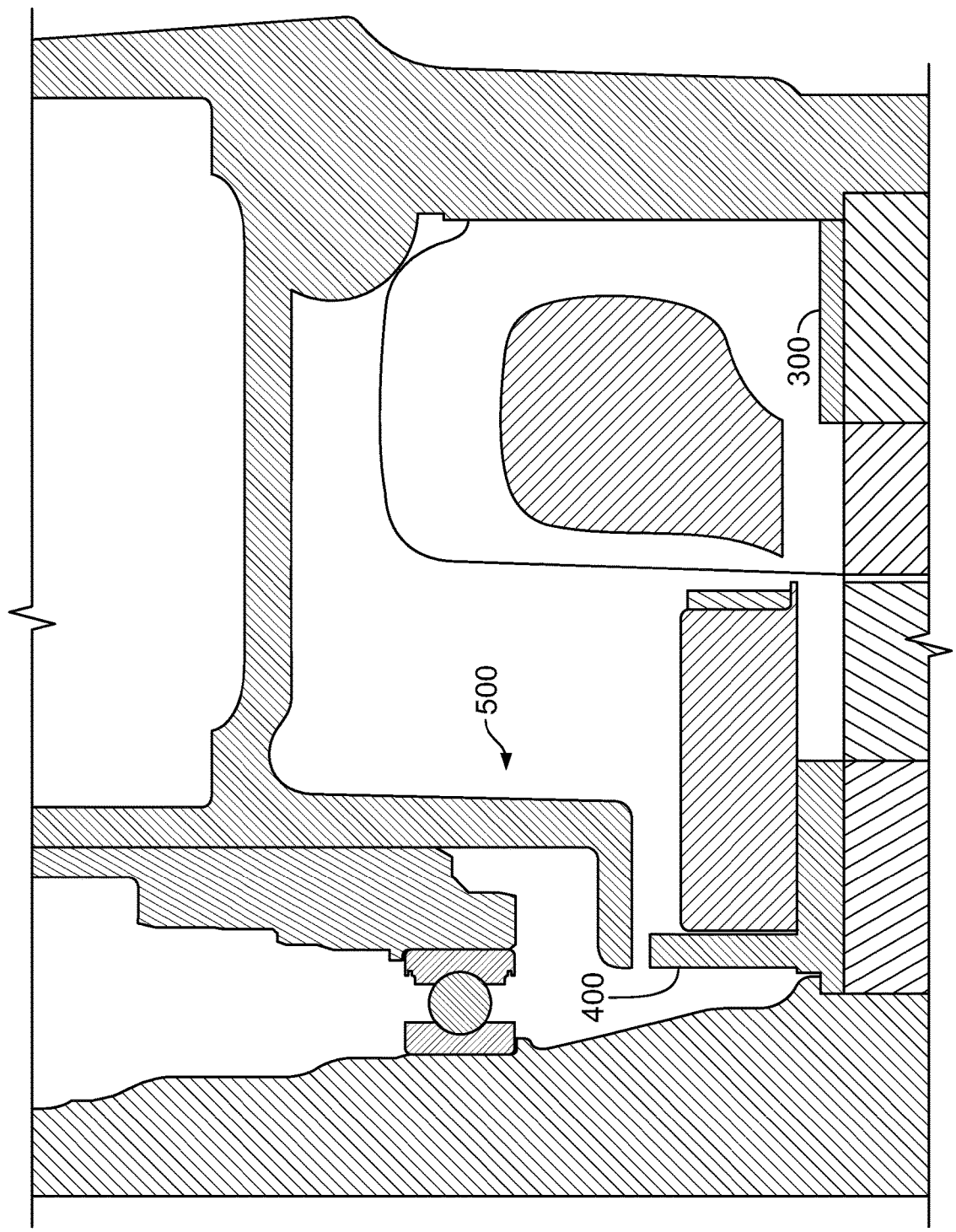

In other implementations, however, one or more rotating flux shields can be used. A rotating flux shield can be used in addition to, or instead of, a stationary flux shield. FIGS. 4-6 show examples of a rotor flux shield 400. Here, a spacer 402 is located on the rotor core portion 106B. The motor here has a rotor end ring 404 that has an essentially rectangular profile. In some implementations, radial deformation of the rotor end ring can be prevented or reduced, for example by a containment ring 406.

The rotor flux shield 400 can have any shape, for example a cylinder shape. Here, the rotor flux shield extends from the spacer in an axial direction, so that these components form an L-shape in cross section. In analogy with examples above, an enclosure is defined by the housing 102, the member 200 and the rotor flux shield 400.

In FIG. 5, a stationary flux shield 500 is provided. In some implementations, the stationary flux is provided by the housing of the motor. Here, the stationary flux shield extends from the member 200.

The stationary flux shield 500 includes a first portion 500A that here is essentially cylinder shaped. The stationary flux shield includes a second portion 500B that in this example extends from the first portion 500A, at one end thereof. For example, the second portion can be essentially disc-shaped, so that one surface thereof faces the rotor end ring 404. Here, the second portion covers part of the surface area of the rotor end ring that faces away from the rest of the rotor; in other implementations, the second portion can cover a smaller or larger surface area of the end ring.

A stationary flux shield can be used together with a stator flux shield. FIG. 6 shows an example where the stator flux shield 300 is being used together with the rotor flux shield 400 and the stationary flux shield 500.

Figure 7:
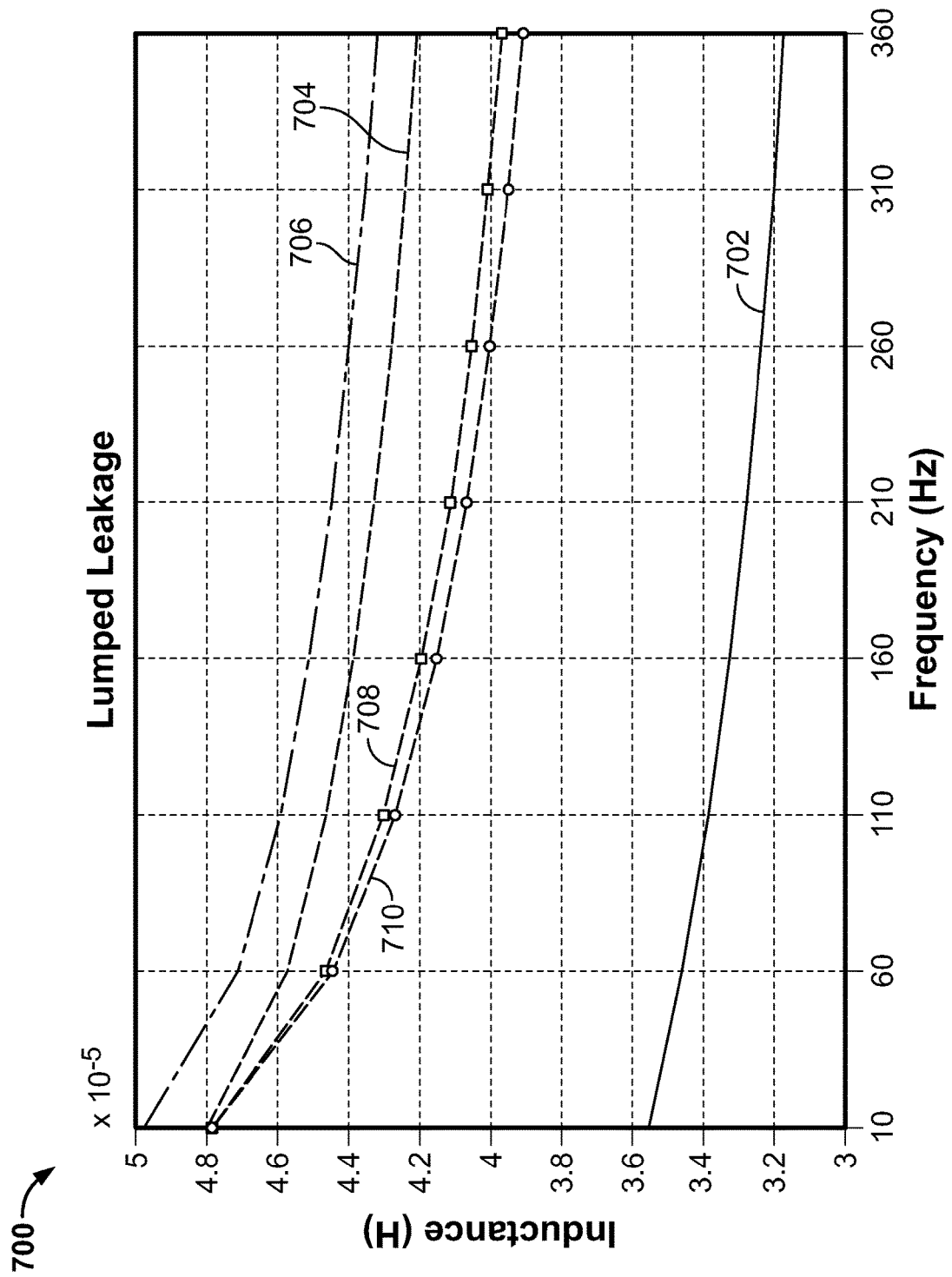
FIG. 7 shows an example graph of rotor end ring leakage as a function of rotor frequency.

FIG. 7 shows an example graph 700 of rotor end ring leakage as a function of rotor frequency. The rotor end ring leakage is measured as an inductance and is shown against the vertical axis. The frequency, in turn, is measured against the horizontal axis.

First, a line 702 shows the leakage from the active part only. That is, this number does not reflect any leakage due to the rotor end ring or the stator end turns. In a sense, the line 702 can be seen as a minimum leakage that cannot be avoided, because it is inherent in the operation of the active part itself.

Next, this graph shows results of computer-based simulations for multiple configurations that involve one or more flux shields, and also different types of rotor end rings. Each example is represented by one of lines 704-710. The line 704 reflects the leakage when using the rotor end ring 106C shown in FIG. 2, but without the flux shield 202 described with regard to that figure. For example, the end ring 106C can be of a shape and a material (e.g., copper) that make the end ring suitable for being brazed to the rest of the rotor. Here, the line 704 has among the largest amounts of leakage of the illustrated examples.

The line 706 corresponds to a rotor end ring that has a rectangular cross section, wherein the base of the rectangle (i.e., the side facing the rotor) is about 2.5 times its height. Due to its shape and material, such an end ring may be suitable for being welded to the rotor using a beam of electrons (sometimes referred to as e-beam welding). Of the illustrated examples, the line 706 has the greatest leakage.

The lines 708 and 710 both involve the rotor end ring 106C shown in FIG. 2. In line 708, only the flux shield 202 (FIG. 2) is used, and in line 710 both flux shields 202 and 300 (FIG. 3) are used.

A number of implementations have been described as examples. Nevertheless, other implementations are covered by the following claims.

What is claimed is:

1. An electric motor comprising:
   a shaft having an axis;
   a housing;
   a rotor positioned within the housing, the rotor including a core portion mounted on the shaft and a plurality of electrically conductive bars having respective first ends and second ends;
   a first bearing insert coupled to the housing and supporting a first end portion of the shaft;
   a first end ring attached to a first outer surface of the rotor and concentric with the shaft, the first end ring comprising an electrically conductive material, the first end ring configured to conductively couple the first ends of the plurality of electrically conductive bars;
   a spacer located on the rotor core portion;
   a stator within the housing;
   a rotating flux shield disposed between the shaft and the first end ring,
   wherein the rotating flux shield is integral with and constructed of the same material as the spacer.

2. The electric motor of claim 1, further comprising a containment ring attached to the first end ring, the containment ring configured to reduce deformation of the first end ring due to centrifugal force.

3. The electric motor of claim 1, further comprising a stationary flux shield which extends from the housing towards the first outer surface of the rotor.

4. The electric motor of claim 3, further wherein the rotating flux shield extends near a base of the first end ring.

5. The electric motor of claim 1, further comprising a second end ring attached to a second outer surface of the rotor and concentric with the shaft, the second end ring comprising an electrically conductive material, the second end ring configured to conductively couple the second ends of the plurality of electrically conductive bars.

6. The electric motor of claim 3, wherein the stator includes first end turns and wherein the stationary flux shield and at least a portion of the housing form a square toroid enclosure, wherein the first end ring and the first end turns are contained in the square toroid enclosure.

7. The electric motor of claim 3, wherein the stationary flux shield includes a disc-shaped portion facing the first end ring.

* * * * *